6873X
D. FITZGERALD.
No Printed Specification Available
Vegetable Cutter.
Patented Dec. 22, 1831.
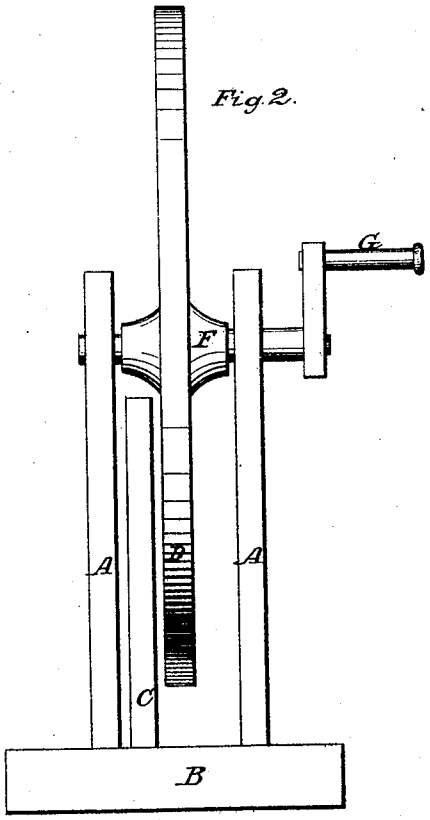
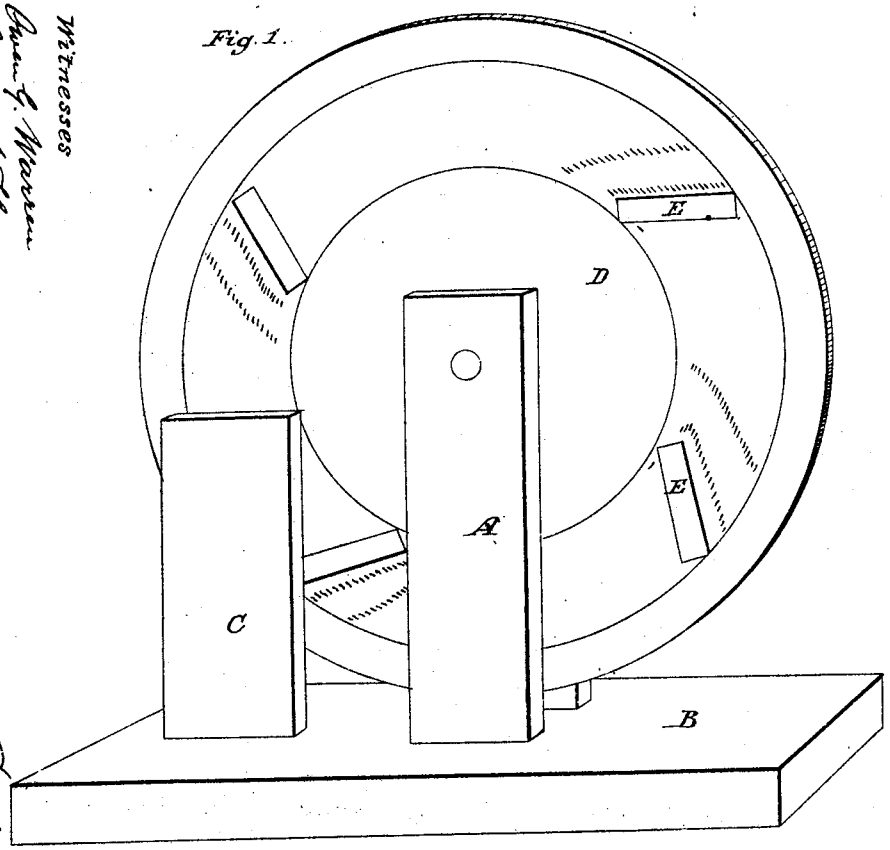
Witnesses
Owen G. Warren
James L. Hopes.
Inventor.
Daniel Fitzgerald.
THE NORRIS PETERS CO., PHOTO-LITHO., WASHINGTON, D. C.

MISSING PAGE TEMPORARY NOTICE

PATENT # 6873 X FOR ISSUE DATE 12-22-1831

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text